B. M. CRAWFORD.
HONEY EXTRACTOR.
APPLICATION FILED JAN. 2, 1920.
1,414,260.
Patented Apr. 25, 1922.
3 SHEETS—SHEET 1.
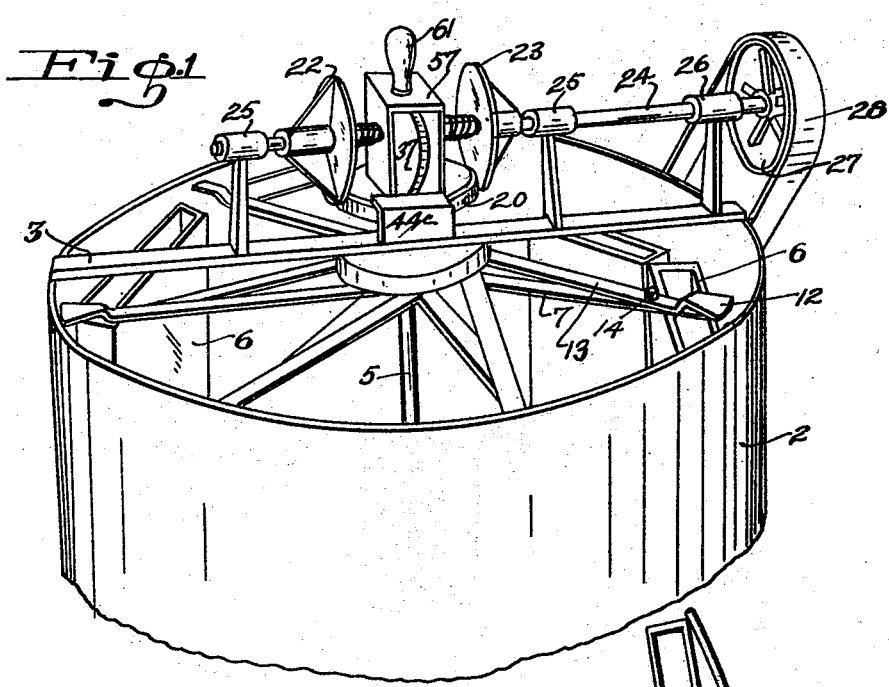

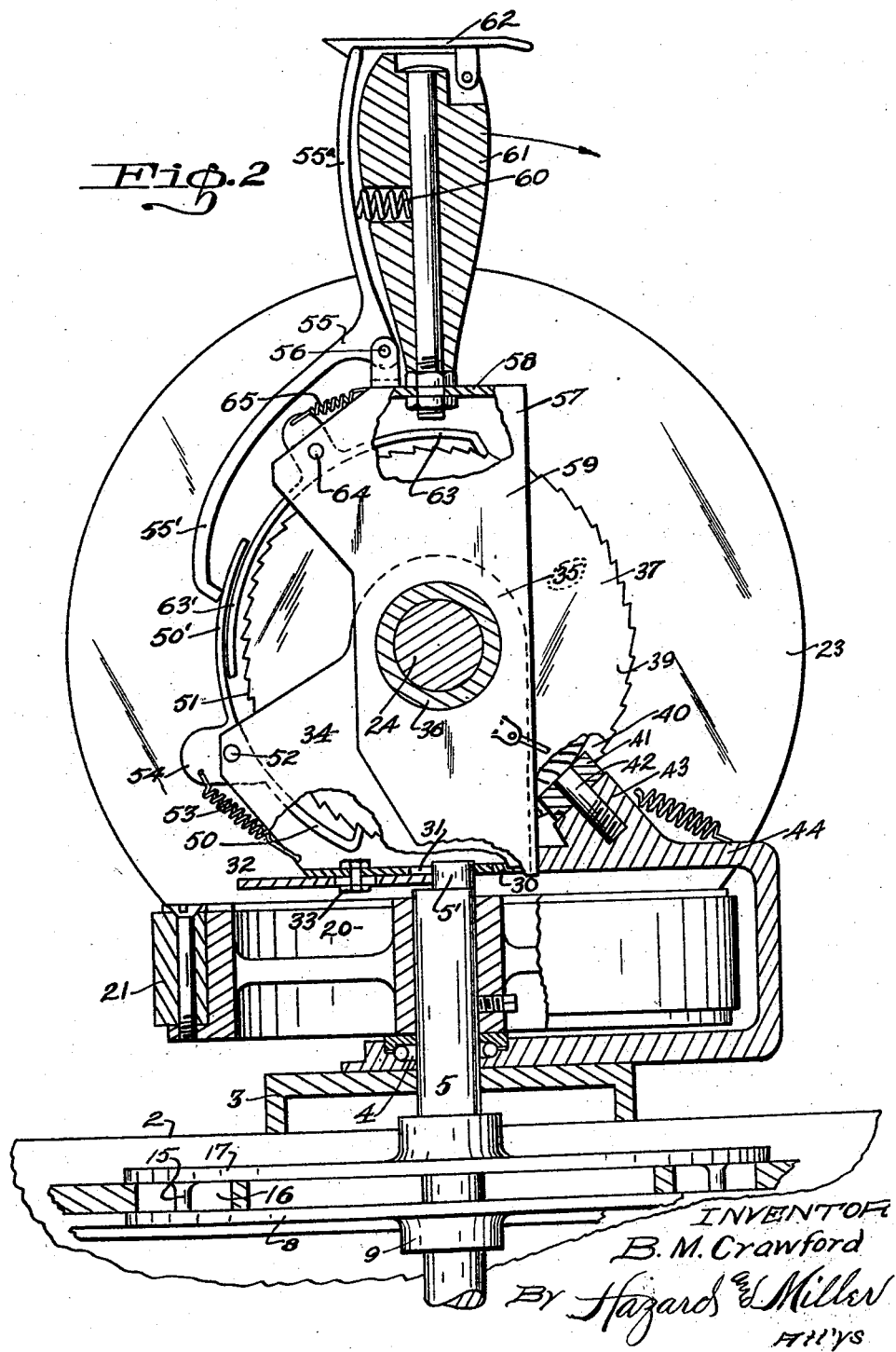

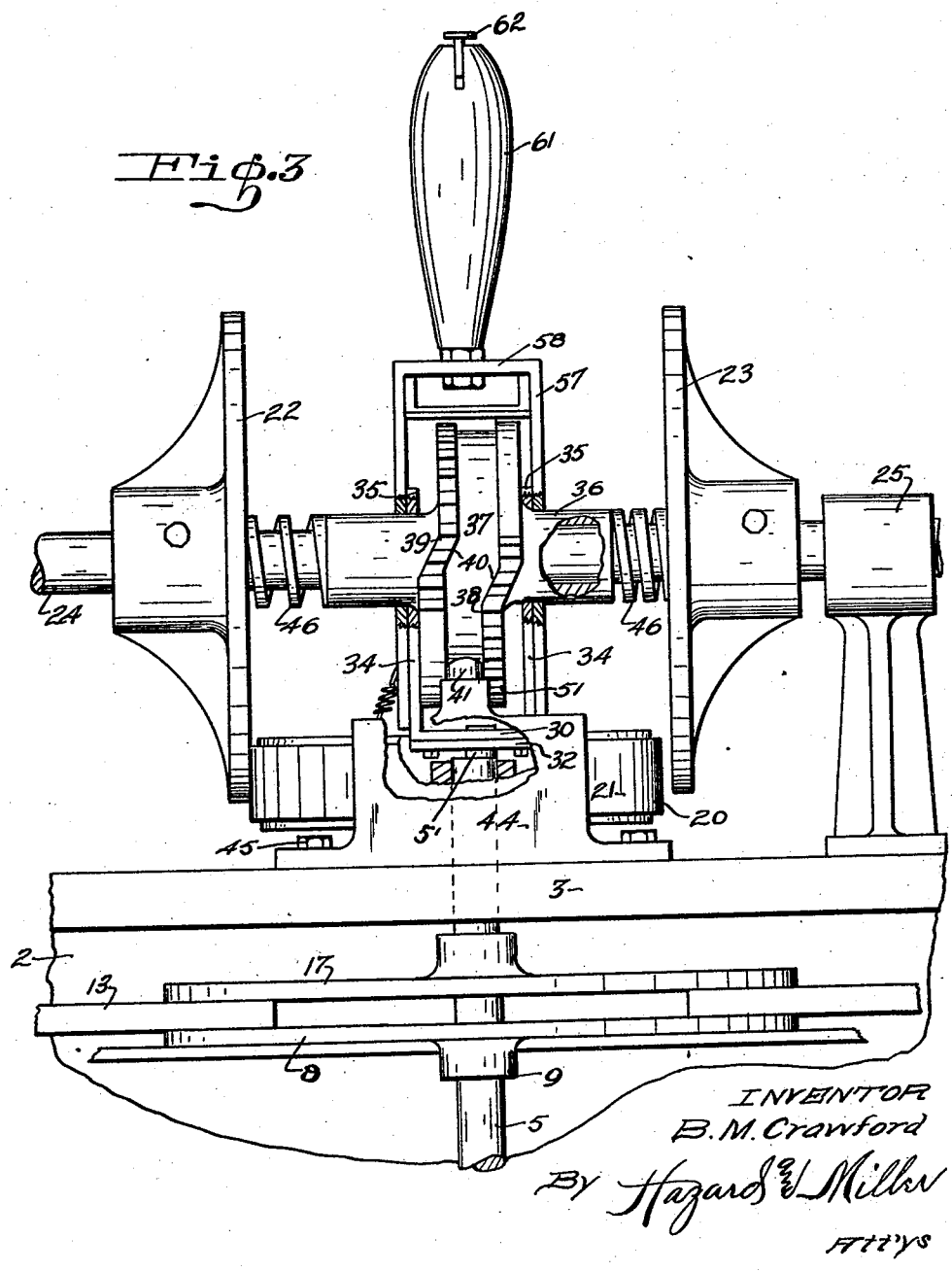

UNITED STATES PATENT OFFICE.

BEATTY M. CRAWFORD, OF SANTA ANA, CALIFORNIA, ASSIGNOR TO VICTOR V. KUNKEL, OF LOS ANGELES, CALIFORNIA.

HONEY EXTRACTOR.

1,414,260. Specification of Letters Patent. Patented Apr. 25, 1922.

Application filed January 2, 1920. Serial No. 349,000.

*To all whom it may concern:*

Be it known that I, BEATTY M. CRAWFORD, a citizen of the United States, residing at Santa Ana, in the county of Orange and State of California, have invented new and useful Improvements in Honey Extractors, of which the following is a specification.

This invention relates to apparatus for the separation of honey syrup from the combs and has for its object to provide an apparatus having a rotary carrier with reversible frames in which latter the comb baskets are arranged so that when the carriers are rapidly carried or revolved through an orbit the honey syrup will be centrifugally thrown from the cells, and a further object of the invention is to provide for the automatic reversal of direction of rotation of the carrier, and for the automatic reversal of the position of the carrier frames, in which latter the combs are secured. An important part of the invention is to secure the automatic reversal of the rotation of the reel or carrier, and the reversal of the carrier frames by power driven means continuously operating, and to provide further for the control of the automatic reversing mechanism so that the rotation of the carrier or reel can be interrupted at will, and the invention consists of the construction, the combination, and in details and arrangements of the parts, an embodiment of which is illustrated in the accompanying drawings and described and claimed hereinafter.

Figure 1 is a perspective of the apparatus showing only a portion of the tank.

Fig. 2 is a transverse, vertical section, through the driving apparatus.

Fig. 3 is a side elevation, partly in section, of the driving apparatus.

Fig. 4 a detail plan, partly in section, of the carrier frame reversing mechanism.

In its illustrated embodiment the invention includes a vertical tank or tub 2 of suitable proportions and across the top and open mouth of which there is arranged a diametrically extending bearing or bridge 3 having at about the center of the tank 2 a bearing 4 in which there is rotatively mounted the upper end of a shaft 5. This shaft is supported at its lower end in a suitable bearing, not shown, adjacent the bottom of the tank 2.

For the purpose of separating the honey from its comb the comb baskets are secured in suitable frames generally indicated at 6 in the drawings. These frames have open opposite parallel sides and they are adapted to be detachably mounted in the outer ends of reel arms 7, of which there is an upper and a lower set having their inner ends suitably connected to discs or plates 8, which in the present case are rotatively mounted by their hubs 9 on the central upright shaft 5. The outer ends of the reel arms 7 are respectively connected by upright rocker rods or shafts 10, having at their upper ends toothed segments such as 11 that are enmeshed with short toothed segments 12; and the latter being provided on the outer ends of lever arms 13 that are fulcrumed near their outer ends as at 14 on the radial arms 7. The inner ends of the lever arms 13 are slidably engaged by suitable driving or actuating means shown as comprising pins 15, of which there is one for each of the arms 13. These pins operate in slots 16 at the inner ends of the lever arms 13, the pins being provided on an upper actuating disc plate 17 that is keyed or otherwise suitably secured on the upper part of the shaft 5 so that when the shaft with its disc 17 is turned in the direction of the arrow in figure 4 the pins 15 will slide outwardly in the slots 16 of the levers 13, and at the same time the levers will be rocked on their fulcrums 14 so that said levers will be changed from the position in full lines to the position shown in dotted lines *a*. This, it will be seen, causes the rack 12 rolling around the shaft 10 to swing the gear 11 and the frame 6 to the dotted line position.

A form of mechanism by which this automatic action is secured is clearly shown in Figs. 2 and 3, in which the upper end of the shaft 5 is shown as provided with a disc or wheel 20 arranged in a horizontal plane and which wheel may have a renewable friction facing 21 on its perimeter. Wheel 20 is adapted to be moved into and out of the engagement with the faces of a pair of oppositely disposed discs 22 and 23 that are secured on a driving shaft 24 having journals 25 on each side of the discs 22—23, one end of the shaft being extended through an end bearing 26 and having a pulley 27 engaging a belt 28; though it is obvious that the shaft 25 may be driven by any suitable mechanism or motor.

One of the important features of the present invention comprises means for automatically shifting the spaced friction discs 22 and 23 with respect to the horizontal friction wheel 20 during the continued drive of the shaft 24 so as to effect a reversal of the direction of rotation of the wheel 20 with its shaft 5, and a means is shown for such purpose comprising a cam 5' provided on its upper end, this cam or eccentric engaging a yoke shaped frame comprising a horizontal bottom plate 30 that is transversely slotted at 31 to receive the cam 5' and the width of the slot 31 is designed to be variable by an adjustable plate 32 attached as by bolts 33 or other suitable means to the bottom 30. The slot 31 is sufficiently long in a line parallel to the axis of the shaft 24 to permit the rotation of the cam 5' without tending to move the yoke sideways, but the width of the slot 31 in a line transverse to the axis of the shaft is made adjustable so as to determine the degree of play of the cam 5' and thereby the degree of movement that would be imparted to the yoke bottom 30 in oscillating on the shaft 24. The yoke is formed by extending upwardly from the parallel side edges of the bottom 30 cheek plates 34 having hub portions 35 at their upper ends which in the present case are loosely mounted on a sleeve 36 that is slidably and rotatively mounted on the shaft 24. On the intermediate portion of the sleeve 36 there is provided a cam wheel 37 having axially offstepped, cam forming flanges 38 and 39. This cam has at suitable portions oblique guide faces 40 and in the channel formed between the flanges or walls 38—39 there projects a cam roller 41, in this case rotatively mounted on a rigid bearing between pin 42 or screw as shown set in a fixed lug 43. This lug comprises a part of a forwardly extending bearing arm 44, that passes around the front face of the friction wheel 20, and being secured as at 45 to the bridge or transverse beam 3.

The space between the inclined or oblique faces 40 in the channel of the cam is slightly greater than the diameter of the roller 41, and which construction is necessary in order to permit said roller 41 to occupy an intermediate or neutral position in the cam groove, and likewise to permit the cam wheel 37 to maintain a neutral position between the discs 22 and 23, and which latter may occupy a neutral or "out of contact position" with friction disc 20.

There is placed against each end of the sleeve or hub 36 of the cam 37 a helical spring 46, these springs reacting against the adjacent hub portions of respective discs 22 and 23 so that as the cam wheel 37 is gradually rotated about the shaft 24 the cam is shifted in one direction or the other axially and by it the shaft 24 is also shifted so as to bring one or the other of the friction discs 22—23 into driving contact with the periphery of the horizontal disc 20.

This intermittent shifting of the shaft 24 to and fro axially and the necessary rotation of the cam wheel 37 to accomplish this shifting are secured by means of the oscillations of the yoke 30 by the cam 5' and through the medium of a pawl lever having a hooked point or points 50 at its lower end to engage the toothed surfaces 51 of the cam wheel 37; the pawl being mounted on a pivot 52 at the rear side of the yoke 30 and being normally thrown into mesh or engagement by means of a spring or other suitable device 53 connected at one end to an ear 54 of the lever and at its opposite end to a convenient fixed part as a portion of the yoke 30. From the above it will be seen that as the shaft 5 rotates, its cam 5' causes the oscillation of the yoke 30 and the intermittent step by step advance of the shifting cam 37 by reason of the intermittent action of the pawl 50. Assuming that the disc 22 is in driving engagement with the wheel 20 as shown in Fig. 3, then when the pawl 50 has rotated the cam wheel 37 to a sufficient degree to bring a deflecting portion 40 of the cam wheel adjacent to the roller 41, the continued rotation of the cam wheel in the same direction causes it to be axially shifted so that in this case the disc 22 would be shifted out of engagement with the wheel 20 while the other disc 23 would be shifted into engagement with said wheel. While the shifting discs are momentarily out of contact with the friction wheel 20 at the neutral position of the cam wheel flanges 38—39 the momentum of the rotating carrier and shaft 5 is sufficient to continue step by step advance of the cam wheel through the action of the pawl 50 and it will be seen that the endwise shifting of the shaft 24 will be continued until the disc 23 is brought into driving engagement with friction disc 20. It is understood that this action shifting will take place automatically during the driving of the shaft 24 and therefor as a result of such automatic action the carrier shaft 5 is first rotated in one direction for a period that is determined by the length of the stroke of the pawl 50, which stroke is variable according to the degree of opening of the slot 31 and the effective driving stroke of the cam 5'.

If it is desired to stop the rotation of the driven shaft 5 it is only necessary for the operator to trip the pawl 50 from engagement with the cam wheel by releasing a tripping device in this present case comprising a lever 55 that is pivoted at 56 on a pair of bearings provided on the upper part of the yoke 57 consisting of a transverse top 58 and downwardly extending side plates 59 that are pivotally mounted on the hub or sleeve 36 and which plates are shown in Fig. 3 as overlapping the adjacent cheek plates 34 of the lower oscillating yoke 30. The trip lever 55 has a downwardly extending finger 55′ inwardly turned over the upper arm 50′ of the pawl 50 and the lever 55 has an upwardly extending handle part 55ª, which is normally pressed outwardly by a suitable spring 60 shown as countersunk in a handle 61 attached to the top plate 58 of the yoke 57 and on the upper end of which is pivoted a latch 62 having a hook in engagement with the retracted upper end of the handle part 55ª of the lever 55 in which position of the last mentioned lever its point 55′ is retracted from the adjacent finger 50′ of the pawl 50 and the latter functions normally. A reverse direction of motion of the cam wheel 37 is prevented by a detent 63 pivoted at 64 on the side plates 59 of the yoke 57; this detent being normally thrown into engagement with the teeth 51 by its spring 65. The detent 63 has also an oppositely extending arm 63′ overlapped by the finger 50′ so that when the tripping lever 55 is released from its latch 62 pawl 50 and detent 63 are rendered inoperative. When it is desired to interrupt the operation of the reel it is only necessary to trip the latch 62 and release the lever 55 which will disengage the pawl 50 and detent 63 from the ratchet teeth 51 of the cam wheel 37, this tripping being done at the moment that the carrier or reel has come to rest and when its momentum has been overcome by the contact of the friction wheel 20 with one or the other of the driving discs 22 or 23 just being brought into reversing action.

It will be understood that cam wheel 37 rotates in an opposite direction to the direction of rotation of the discs 22 and 23, and when the machine is viewed from the left hand side as illustrated in Fig. 2, the cam wheel and its sleeve rotate from the bottom upwardly and toward the right hand, while discs 22 and 23 rotate in a reverse direction or from the top downwardly and toward the left hand.

When the momentum of the reel is overcome by the engagement of one of the discs, for instance, the discs 23 with friction wheel 20, roller 41 has shifted the cam wheel 37 and the disc 22 toward the left hand, thereby compressing the spring 46 that is between said cam wheel and said disc 22, and with the parts so positioned, the roller 41 occupies a position between the inclined or oblique faces 40, but still in contact with one of said faces.

At this point the reel comes to a period of rest and immediately latch 62 is released, thereby permitting lever 55 to act to release pawl 50 and detent 63 from the cam wheel 37, thereby releasing the same, and spring 46 that is adjacent to disc 22 will now expand slightly to force the cam wheel toward disc 23, and as a result of the engagement of the left hand one of the inclined faces 40 against the roller 41, the cam wheel is caused to rotate a slight distance rearwardly with the result that the roller 41 will occupy a central or neutral position between the inclined surfaces 40, and likewise the cam wheel 37 and discs 22 and 23 will occupy neutral positions, and with said discs 22 and 23 out of engagement with the periphery of friction disc 20.

Obviously when so positioned the springs 46 are under equal tension, and the parts are retained in their neutral positions until a succeeding operation of lever 55 sets the parts for successive operation.

To secure the renewal of driving engagement of one or the other of the driving discs with the interposed wheel 20 it is only necessary for the operator to trip the handle part 55ª of the lever 55 and retract it to be engaged by the latch 62 and at the same time to pull the handle in the direction of the arrow thereon, which, by reason of the engagement of the pawl 63 with the teeth 51 of the reversing cam 37 will enable the latter to be turned to a considerable degree of movement about the shaft 24 to quickly cause the shifting of the sleeve by reason of the engagement of the oblique part of the cam channel part 40 with the roller 41 and the resultant reactions therebetween.

Various changes may be made without departing from the spirit of my invention as claimed.

I claim:

1. A centrifugal honey extractor including a vessel, a shaft journaled in the vessel, a reel rotatively mounted on said shaft, honey comb carriers pivotally mounted on said reel, a disk secured on said shaft, gears on the pivots of said honey comb carriers, levers pivoted on said reel, segmental gears on said levers meshing with the gears on said honey comb carriers, one end of said levers having slots, pins on said disk engaging said slots, and automatically operating means, including a friction disc mounted on said reel carrying shaft and a pair of positively driven discs that are adapted to alternately engage the first mentioned friction disc, for rotating said reel carrying shaft first in one direction and then in the other direction.

2. A centrifugal honey extractor including a vessel, a reel shaft journaled in said vessel, a reel mounted on said shaft, honey comb carriers mounted on said reel, means for automatically reversing the positions of said honey comb carriers when the direction of rotation of said reel is reversed, a friction drive wheel secured on said shaft, a slidably mounted drive shaft, a pair of friction disks on said drive shaft, a sleeve slidably journaled on said drive shaft, a spring on said drive shaft interposed between each end of said sleeve and one of said friction disks, a cam on said sleeve, a roller mounted upon a bracket on said vessel and engaging said cam to shift said sleeve on said shaft first in one direction and then in the other to shift first one friction disk and then the other into engagement with said friction wheel, and means actuated by said reel shaft for rotating said sleeve and cam.

3. A centrifugal honey extractor including a vessel, a reel shaft journaled in said vessel, a reel mounted on said shaft, honey comb carriers mounted on said reel, means for automatically reversing the positions of said honey comb carriers when the direction of rotation of said reel is reversed, a friction drive wheel secured on said shaft, a slidably mounted drive shaft, a pair of friction disks on said drive shaft, a sleeve slidably journaled on said drive shaft, a spring on said drive shaft interposed between each end of said sleeve and one of said friction disks, a cam wheel on said sleeve, a roller mounted upon a bracket on said vessel and engaging said cam wheel to shift said sleeve on said driving shaft first in one direction and then in the other to shift first one friction disc and then the other into engagement with said friction wheel, an oscillative yoke mounted on said sleeve, a cam on said reel shaft for engaging and oscillating said yoke, a ratchet on said sleeve, and a pawl on said yoke for engaging said ratchet for rotating said sleeve and said cam wheel.

4. A centrifugal honey extractor comprising a vessel; a reel rotatively mounted in the vessel and having reversible honey comb carriers; means for automatically reversing the said carriers when the rotation of the reel is reversed; automatically operating means, including a friction disc mounted on said reel carrying shaft and a pair of positively driven discs that are adapted to alternately engage the first mentioned friction disc, for periodically reversing the direction of rotation of the reel; and a driving means operative continuously in one direction during the operation of the apparatus.

5. A centrifugal honey extractor having a collecting vessel; a reel rotatively mounted in the vessel and having pivotally mounted comb carrying frames; automatically operating means, including a friction disc mounted on said reel carrying shaft and a pair of positively driven discs that are adapted to alternately engage the first mentioned friction disc, for reversing the direction of rotation of the reel alternately at predetermined periods and simultaneously reversing the positions of the pivotally mounted comb carrying frames.

6. A centrifugal honey extractor having a collecting vessel; a reel rotatively mounted in the vessel and having pivotally mounted comb carrying frames; and automatically operating means, including a friction disc mounted on said reel carrying shaft and a pair of positively driven discs that are adapted to alternately engage the first mentioned friction disc, for reversing the direction of rotation of the reel alternately at predetermined periods and simultaneously reversing the positions of the pivotally mounted comb carrying frames, said means including a driving shaft operative continually in one direction during the operation of the apparatus.

7. A centrifugal honey extractor comprising a vessel, a shaft rotatively mounted in the vessel and carrying a reel rotative on the shaft, said reel having comb carrying frames; and automatically operating means, including a friction disc mounted on said reel carrying shaft and a pair of positively driven discs that are adapted to alternately engage the first mentioned friction disc, for reversing the positions of said carrying frames and for alternately reversing the direction of rotation of said shaft.

8. A centrifugal honey extractor comprising a vessel, a shaft rotatively mounted in the vessel and carrying a reel rotatively on the shaft, said reel having comb carrying frames; and automatically operating means for reversing the position of said comb carrying frames and for alternately reversing the direction of rotation alternately of the said shaft, said means including a driving shaft continuously operative in one direction during the operation of the apparatus, a pair of friction discs carried by said driving shaft, and an automatically operating reverse gear device, including a friction disc that is adapted to be alternately engaged by the friction discs on the driving shafts, for connecting the driving shaft and the driven shaft.

9. A centrifugal honey extractor comprising a vessel, a shaft rotatively mounted in the vessel and carrying a reel rotatively on the shaft, said reel having comb carrying frames; and automatically operating means for reversing the positions of said comb carrying frames and for alternately reversing the direction of rotation of the said shaft, said means including a driving shaft continuously operative in one direction during the operation of the apparatus, a pair of friction discs carried by said driving shaft, and an automatically operating reverse gear device, including a friction disc that is adapted to be alternately engaged by the friction discs on the driving shaft, for connecting the driving shaft and the driven shaft; a pair of friction discs carried by said driving shaft; and means for interrupting the operation of the reversing mechanism without stopping the driving shaft.

10. A centrifugal honey extractor comprising a vessel, a shaft rotatively mounted in the vessel and carrying a reel rotatively on the shaft, said reel having comb carrying frames; automatically operating means for reversing the said carrying frames and for alternately reversing the direction of rotation of the said shaft, said means including a driving shaft continuously operative in one direction during the operation of the apparatus, a pair of friction discs carried by said driving shaft, and an automatically operating reverse gear device, including a friction disc that is adapted to be alternately engaged by the friction discs on the driving shaft, for connecting the driving shaft and the driven shaft; and means for regulating the periodicity of the reversal action.

11. In a centrifugal honey extractor, a vessel having a driven shaft therein, a reel loosely mounted on the shaft and having reversible honey comb carriers; a driven device secured to the shaft, a constantly rotating driving shaft, connections therefrom to said driven device, and automatically operating means connecting said device to said carriers, a pair of friction discs carried by said driven shaft and a friction disc carried by the reel carrying shaft for reversing the positions of the comb carriers concurrently with a reversal of direction of rotation of the driven device and shaft.

12. A centrifugal honey extractor including a vessel, a reel shaft journaled in said vessel, a reel mounted on said shaft, honey comb carriers mounted on said reel, automatically operating means for reversing the positions of said honey comb carriers when the direction of movement of said reel is reversed, a friction drive wheel secured on said shaft, a slidably mounted drive shaft, a pair of friction disks on said drive shaft, a sleeve slidably journaled on said drive shaft, a spring on said drive shaft interposed between each end of said sleeve and one of said friction disks, a cam wheel on said sleeve, a roller mounted upon a bracket on said vessel and engaging said cam wheel to shift said sleeve on said shaft first in one direction and then in the other to shift first one friction disk and then the other into engagement with said friction wheel, an oscillative yoke mounted on said sleeve, a cam on said reel shaft for engaging and oscillating said yoke, a ratchet on said sleeve, a pawl on said yoke for engaging said ratchet and rotating said sleeve and said cam wheel, a second yoke oscillatively mounted on said sleeve, a pawl on said second yoke engaging said ratchet, and a handle on said second yoke for oscillating it and causing its pawl to advance said ratchet, sleeve and cam wheel.

13. A centrifugal honey extractor including a vessel, a reel shaft journaled in said vessel, a reel mounted on said shaft, honey comb carriers mounted on said reel, automatically operating means for reversing the positions of said honey comb carriers when the direction of rotary motion of said reel is reversed, a friction drive wheel secured on said shaft, a slidably mounted drive shaft, a pair of friction disks on said drive shaft, a sleeve slidably journaled on said drive shaft, a spring on said drive shaft interposed between each end of said sleeve and one of said friction disks, a cam wheel on said sleeve, a roller mounted upon a bracket on said vessel and engaging said cam wheel to shift said sleeve on said shaft first in one direction and then in the other to shift first one friction disk and then the other into engagement with said friction wheel, an oscillative yoke mounted on said sleeve, a cam on said reel shaft for engaging and oscillating said yoke, a ratchet on said sleeve, a pawl on said yoke for engaging said ratchet and rotating said sleeve and said cam wheel, a second yoke oscillatively mounted on said sleeve, a pawl on said second yoke engaging said ratchet, and a handle on said second yoke for oscillating it and causing its pawl to advance said ratchet, sleeve and cam wheel, a lever pivoted on said second yoke in position to be grasped with said handle to disengage said first pawl from said ratchet and to cause said first ratchet to disengage said second pawl from said ratchet, and a latch for normally engaging said lever and holding it out of engagement with said first pawl.

14. A centrifugal honey extractor including a vessel, a reel rotatably mounted in said vessel, reversible honey comb carriers mounted on said reel, automatically operating means including a friction disc mounted on said reel carrying shaft and a pair of positively driven discs that are adapted to alternately engage the first mentioned friction disc for reversing the direction of rotation of said reel and simultaneously reversing the positions of said carriers when said reel has rotated several revolutions in one direction.

15. A centrifugal honey extractor including a vessel, a reel rotatably mounted in said vessel, reversible honey comb carriers mounted on said reel, automatically operating means including a series of three friction discs, two of which are adapted to alternately engage the third disc for reversing the direction of rotary movement of said reel and simultaneously reversing the positions of said carriers when said reel has rotated several revolutions in one direction, and driving means operating constantly in one direction for driving said reel.

16. A centrifugal honey extractor including a vessel, a reel rotatably mounted in said vessel, reversible honey comb carriers mounted on said reel, automatically operating means including a series of three friction discs, two of which are adapted to alternately engage the third disc for reversing the direction of rotation of said reel when the same has rotated several revolutions in one direction and positively acting automatic means for reversing the positions of said carriers when the rotary motion of said reel is reversed.

17. In a centrifugal honey extractor, the combination with a shaft that is adapted to be constantly driven in one direction, of a reel and a reel carrying shaft, comb holders reversibly mounted on said reel, driving connections between said constantly driven shaft and the reel carrying shaft and means for positioning said driving connections so as to drive the reel carrying shaft first in one direction and then in the opposite direction and connections whereby the comb carriers automatically reverse their positions simultaneously with the reversal of movement imparted to the reel carrying shaft.

In testimony whereof I have signed my name to this specification.

B. M. CRAWFORD.